United States Patent [19]
Prosyanyuk et al.

[11] Patent Number: 6,042,963
[45] Date of Patent: Mar. 28, 2000

[54] PYROTECHNIC ELECTRIC GENERATOR

[75] Inventors: Vyatcheslav Vasil'evitch Prosyanyuk; Ivan Stepanovitch Suvorov; Valariy Nilovitch Yemelyanov; Alexey Ivanovitch Sidorov, all of Moskowskaya oblast', Russian Federation

[73] Assignee: R-Amtech International, Inc., Bellevue, Wash.

[21] Appl. No.: 08/929,422

[22] Filed: Sep. 15, 1997

[30] Foreign Application Priority Data

Sep. 20, 1996 [DE] Germany .................. 196 38 628

[51] Int. Cl.[7] .................................................. H01M 6/36
[52] U.S. Cl. .................................................. 429/112
[58] Field of Search ........................... 429/110, 112, 429/115

[56] References Cited

U.S. PATENT DOCUMENTS

| | | | |
|---|---|---|---|
| 4,034,143 | 7/1977 | Sweet | 429/112 |
| 5,011,750 | 4/1991 | Plichta et al. | 429/112 |
| 5,114,805 | 5/1992 | Behl et al. | 429/112 |

FOREIGN PATENT DOCUMENTS

2088558 C1  8/1997  Russian Federation .

*Primary Examiner*—Maria Nuzzolillo
*Assistant Examiner*—Susy Tsang
*Attorney, Agent, or Firm*—Rothwell, Figg, Ernst & Kurz, p.c.

[57] ABSTRACT

The invention relates to a pyrotechnic electric generator including an anode and cathode having pyrotechnic charges with an excess of fuel-anode and an excess of oxidation agent cathode, the anode and cathode being separated by of a separator, cherrin the anode, cathode and separator contain asbestos as a binding agent and are formed with a ratio of maximum dimension to thickness of 20 to 130, wherein the fuel in the anode and in the cathode is zirconium and the separator is formed from lithium fluoride, alkaline earth fluoride or their mixture.

3 Claims, 1 Drawing Sheet

Figure
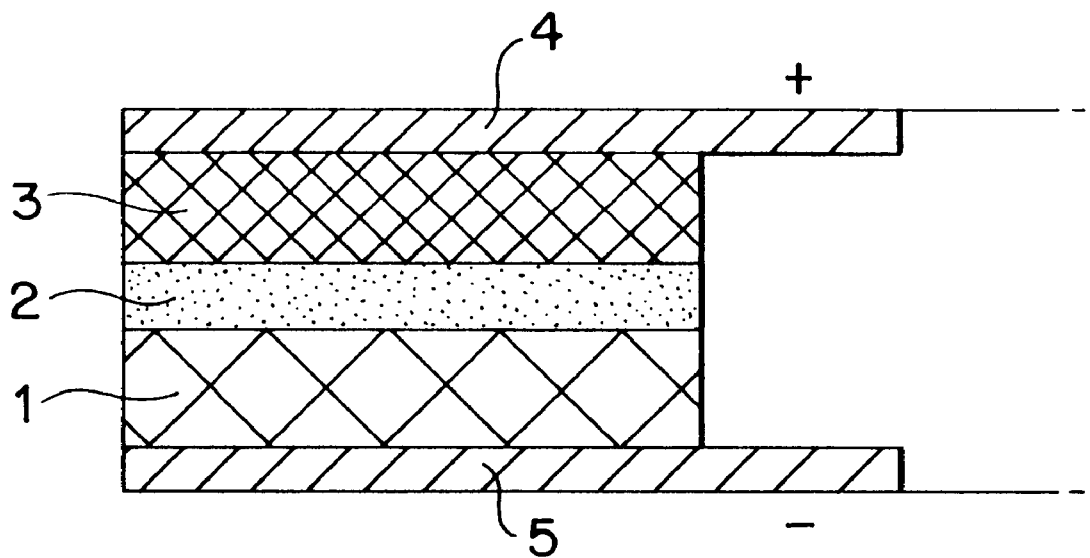

PYROTECHNIC ELECTRIC GENERATOR

BACKGROUND OF THE INVENTION

1. Field of the Invention

The invention relates to a device for converting chemical energy of an exothermic mass into electrical energy, e.g. high temperature storage sources for dc which are intended for use in operation in wait condition and to supply on-board equipment independently for devices and equipment (heating bridges, pyro-energy sensors, micro drives, relays and the like) which are used in different systems in automated engineering, including for triggering fire extinguishing equipment, signaling devices, warning devices, jamming devices and the like).

2. Description of the Background Art

Primary stored current sources using pyrotechnic charges are known from the patent and scientific literature (Bagozki W. S., Skundin A. M., Chemische Stromquellen [Chemical Sources of Current] M. Energoizdad, 1981, pages 304–310; Crompton T., Primare Stromquellen [Primary Current Sources], N.: Mir 1986, pages 295, 328 inter alia). However, these primary stored current sources have a complicated construction and require long start-up times, since the development of the electrical current in these devices is only possible after burning off the pyrotechnic charge (pyroheater). This guarantees the melting of the solid electrolyte (salts or salt mixtures), which is disposed between the anode and the cathode and the heating of the two electrodes to operational temperature. The activating time of the store source is reduced because the heating element is installed directly in the electrochemical element. The above mentioned construction solution of the device (Kukots F. l. inter alia Warmestromquellen, [heating current sources], Rostow-am-Don University Publishers 1989, pages 61–63) virtually excludes the construction of a battery from the current-producing parts, wherein however only those batteries are of importance (current-producing device) which comprise voltages of 9–12 V and higher.

Moreover, the presence of pyrotechnic and electrochemical components renders it necessary to produce these separately owing to fire and explosion safety regulations whilst adhering to certain regulations for the technological procedures which hampers their production. Moreover, it is also economically disadvantageous to use the. above mentioned current sources in systems for intermittent and pulsed supply.

DE-OS 2046144 describes a thermally activated galvanic primary element according to the system calcium/lithium-potassium chloride/calcium chromate comprising two outer-lying positive electrodes and an inner-lying negative electrode and a heating element, wherein the electrodes and the electrolyte layer are formed using the thin-layer method of construction and the thickness of the element perpendicular to the electrode surfaces is approximately 1.6–2.0 mm and not greater than 2.5 mm.

In so doing, the positive electrodes of the element preferably have a current collector consisting of fine mesh nickel wire into which the positive mass consisting of calcium chromate and a mixture of lithium chloride and potassium chloride is fused.

The negative electrode of the element consists preferably of a wire netting or coarse perforated sheet nickel plate onto both sides of which are pressed calcium metal layers.

The Russian application N94013374/02 (013252) describes a pyrotechnic pulsed current generator which consists of two electrodes which as a thin semi-charge consists of pyrotechnic masses with the ratio of diameter to height of 30–80. The fundamental disadvantage of this device is the short generation time (pulse not longer than 1.0 sec.) which considerably limits the application options.

The closest prior art is described in the Russian patent N2018782 in which both electrodes are designed as pressed pyrotechnic charges (semi-charges) with a ratio of diameter to height of each semi-charge equal to 2.0–2.5. In so doing, the anode as a pyrotechnic charge comprising an excess of fuel and the cathode comprising an excess of oxidation agent and the separator, which separates the anode and the cathode is formed from a porous dielectric. The cathode is produced from a mixture of lead fluoride, lithium fluoride and aluminium fluoride, the anode is produced from a mixture of lead fluoride, magnesium fluoride and lithium fluoride.

The fundamental disadvantage of this known solution is the long time period between the moment of switch-on to the moment in which the maximum current strength is achieved, which is caused by the low burning rate of the pyrotechnic electrodes and the inertia of the separator containing the pores, wherein a considerable amount of time (longer than 0.5 sec.) is required to fill the pores by means of the electrolyte in order to achieve ion permeability. Moreover, the known device is provided as a single element current source.

SUMMARY OF THE INVENTION

The object of the present invention is to provide a pyrotechnic current generator which comprises greater output capability and becomes effective more rapidly, i.e. a shorter time period between the start-up and the maximum current strength being achieved.

BRIEF DESCRIPTION OF THE DRAWING

The sole FIGURE shows a device in accordance with the present invention.

DETAILED DESCRIPTION OF THE INVENTION

The above mentioned object is achieved as shown in the claims hereinunder.

The invention relates to a pyrotechnic electric generator comprising an anode and a cathode separated therefrom by means of a separator, wherein the anode comprises a pyrotechnic charge comprising an excess of fuel and the cathode comprises a pyrotechnic charge comprising an excess of oxidation agent, wherein the anode, cathode and separator contain asbestos as the binding agent and the anode, cathode and separator in each case comprise a ratio of maximum size to thickness of 20 to 130, wherein the fuel in the anode and in the cathode is zirconium and the separator comprises lithium fluoride, alkaline earth fluoride or their mixture.

Preferably, the anode contains the following components in the proportions quoted in percentage mass:

| | |
|---|---|
| Zirconium | 37–83 |
| Barium chromate or Copper oxide | 15–51 |
| Asbestos | 2–12 | the cathode contains the following components in the proportions quoted in percentage mass:

| | |
|---|---|
| Zirconium | 3–28 |
| Copper oxide | 60–95 |
| Asbestos | 2–12 | and the separator contains the following components in the proportions quoted in percentage mass:

| | |
|---|---|
| Asbestos | 3–20 |
| Lithium fluoride or Alkaline earth fluoride or their mixture | 80–97 | wherein if necessary the separator can contain in addition zirconium oxide in a quantity of up to 60 percentage mass in relation to the total mass, wherein the mass ratio of asbestos to lithium fluoride or alkaline earth fluoride corresponds to the percentage ratio quoted above.

The substantial difference between the device in accordance with the invention and the known device is the presence of asbestos in the electrodes and of the electrolyte in the pores of the separator, as well as the ratio between the maximum size of the anode, cathode and the separator to their thickness and the new composition of all elements.

In the device in accordance with the invention the asbestos plays an active role in the current-producing processes owing to the thermochemical effect of the burning products of the anode and the cathode. However, together with the fluorides and zirconium dioxide, the ion permeability between the electrodes during the current-producing process is guaranteed in the device in accordance with the invention and fluid products are prevented from flowing out and there is no possibility of any undesired short circuit in the electrodes and the elements of the battery.

Furthermore, the use of asbestos together with the other components guarantees that the ratio of maximum dimension of anode, cathode and of the separator to their thickness of 20–130 is achieved (formation of thin-layer elements of any desired geometrical shape in the case of extremely high sensitivity of pyrotechnic electrodes on the heat start pulse). This all allows the capacity of the generator to be increased in the limits of the previous dimension and a rapid effectiveness. If the amount of asbestos present is less than 2%, then the durability of the charge and the required intensity of the current-producing processes is no longer guaranteed. If more than 12% asbestos is used, then the burning rate and the heating value of the device reduce. Zirconium is the fuel and the active material of the anode and cathode. Copper oxide and barium chromate assume the role of the oxidation agent. Lithium fluoride, magnesium fluoride, barium fluoride, strontium fluoride and calcium fluoride or their mixtures guarantee, upon the burning of the pyrotechnic electrodes and together with the products of the primary burning, the ion permeability between the condensed residues (slag) of the anode and cathode.

In the case of a ratio of maximum dimension of the anode, cathode and of the separator to their thickness being less than 20, the dimension of the cells and of the battery of the elements increases and the starting parameters reduce owing to the increase in the internal resistance. In the case of a ratio of more than 130 the devices are no longer technologically viable and the stability reduces.

The formulations in accordance with the invention for the anode and the cathode guarantee the possibility of producing thin-layered porous charges with high sensitivity to the start pulse, which renders possible a rapid and complete burning and also for the electrochemical processes between anode and cathode to take place. This results in a rapid reaction time, good electrical characteristics and the possibility of producing batteries of minimum dimension and comprising many elements. Furthermore, the solution in accordance with the invention renders possible a production-line method of manufacture on semi-automated production lines having high output capabilities and with relatively non-dangerous slip casting (vacuum precipitation of the mixture of the components).

The device in accordance with the invention is described in the figure, wherein the anode 1 and the cathode 3 are formed as thin-layered pyrotechnic charges (plates) which are separated by means of a thin separator 2 of the same size and are disposed between electrical lines 4 and 5.

The device in accordance with the invention functions as follows: the anode 1 and the cathode 3 ignite with the ignition pulse and, as a result of the construction and the composition of the components, the instant the charge ignites, the transfer begins of electrons from the outer chain of the fuel (zirconium) in the anode 1 via the current line 5 at the anode to the cathode line 4 and the oxidation agent (copper oxide) in the cathode 3. The efficiency of the charged particles is as a result of the electrochemical oxidation of the spatially separate fuel (zirconium in the anode 1) and the electrochemical reduction of the oxidation agent (copper oxide in the cathode 3) and the contact of these reagents via the layer of an ion-conductive material of the separator 2.

The ratio of the maximum dimension and the thickness of the anode, the cathode and the separator of 20 to 130, the small thickness of the electrodes and the separator (0.2–2mm) and the composition of the components provide the device with the ability to have a rapid effect and capability as well as a low internal resistance, which enables the device to be kept extremely small (minimum dimension) and to be stable and comprise other good characteristics.

The components used were production-line products: zirconium specified in Russian Standard TU 48-4-234-84, barium chromate GOST 4211-68, copper oxide as specified in Russian Standard GOST 16539-79, asbestos as specified in Russian Standard TU 21-22-3-81, lithium fluoride as specified in Russian Standard TU 6-01-3529-84, barium fluoride as specified in Russian Standard TU 6-09-01-261-85, strontium fluoride as specified in Russian Standard TU 6-09-1434-77, calcium fluoride as specified in Russian Standard TU 6-09-02-572-79 and magnesium fluoride as specified in Russian Standard TU 6-09-2674-77.

The components correspond to Russian Standard GOST W84-2072-83 and the asbestos was obtained in accordance with the method of the instruction as specified in Russian Standard 3RP-1171-89. The zirconium, barium chromate, copper oxide and the metal fluorides were used as powder comprising a particle size of 100 microns, the asbestos comprised a length of 0.1–3 mm and a diameter of 0.001–0.1 mm of fibres.

The device in accordance with the invention can be used for the independent supply of on-board equipment, such as heating bridges, pyro-energy sensors, micro drives, relays and the like, and also for various automatic purposes, e.g. in the case of fire extinguishing equipment, signaling devices, warning devices, jamming devices and the like. Within the scope of the sensor it is possible to provide independent sensors or also remote controllers in the case of fire fighting and in the case of information that a critical temperature has been reached in storage rooms and in manufacturing operations.

TABLE 1

Ratio of the components in the anode quoted in percentage mass

| Description of the components | Prior Art Russian Pat. N2018782 | Examples for the composition of the anode in the generator in accordance with the invention | | | | | | | | | |
|---|---|---|---|---|---|---|---|---|---|---|---|
| | | 1 | 2 | 3 | 4 | 5 | 6 | 7 | 8 | 9 | 10 |
| Zirconium | — | 35 | 37 | 60 | 83 | 85 | 35 | 37 | 60 | 83 | 85 |
| Barium chromate | — | 52 | 51 | 33 | 15 | 14 | — | — | — | — | — |
| Copper oxide | — | — | — | — | — | — | 52 | 51 | 33 | 15 | 14 |
| Asbestos | — | 13 | 12 | 7 | 2 | 1 | 13 | 12 | 7 | 2 | 1 |
| Magnesium | 22 | — | — | — | — | — | — | — | — | — | — |
| Lead fluoride | 58 | — | — | — | — | — | — | — | — | — | — |
| Lithium fluoride | 20 | — | — | — | — | — | — | — | — | — | — |

TABLE 2

Ratio of the components in the cathode quoted in percentage mass

| Description of the components | Prior Art Russian Pat. N2018782 | Examples for the composition of the cathode in the generator in accordance with the invention | | | | |
|---|---|---|---|---|---|---|
| | | 1 | 2 | 3 | 4 | 5 |
| Zirconium | — | 2 | 3 | 15 | 28 | 30 |
| Copper oxide | — | 97 | 95 | 77 | 60 | 56 |
| Asbestos | — | 1 | 2 | 8 | 12 | 14 |
| Aluminium | 3 | — | — | — | — | — |
| Lead fluoride | 88 | — | — | — | — | — |
| Lithium fluoride | 9 | — | — | — | — | — |

TABLE 3

Ratio of the components in the separator quoted in percentage mass

| Description of the components | Prior Art Russian Pat. N2018782 | Examples for the composition of the separator in the generator in accordance with the invention | | | | | | | | |
|---|---|---|---|---|---|---|---|---|---|---|
| | | 1 | 2 | 3 | 4 | 5 | 6 | 7 | 8 | 9 |
| Asbestos | 100 | 1 | 3 | 12 | 20 | 35 | 10 | 10 | 10 | 10 |
| Lithium fluoride or alkaline earth fluoride or fluoride mixture | — | 99 | 97 | 88 | 80 | 75 | 88 | 60 | 30 | 20 |
| Zirconium oxide | — | — | — | — | — | — | 2 | 30 | 60 | 70 |

A comparison between the device in accordance with the invention and the known device was carried out, in that the electrodes were ignited for example using a glowing chrome-free coil, wherein the voltage (strength of current per load 4 Ohm) and the duration was measured at room temperature with the aid of an oscillograph. The results of the test are shown in Table 4. Table 4 shows the characteristics of the device in accordance with the invention having the best composition of the anode (variant N3 and N7), the cathode (variant N3) and the separator (variant N3 and N7) in comparison to the known device. It is evident from this table that the device in accordance with the invention is superior to the known device in all parameters.

A battery consisting of two and several devices in accordance with the invention guarantees that current is produced in 0.05–0.1 sec after initiating the start pulse (all anode and cathode charges (electrodes) ignite, burn and produce current).

The maximum strength of current is obtained in 0.20±0.05 sec from commencement of the work in the case of a process of general duration of not less than 6–12 sec.

TABLE 4

Result of the examination of the device in accordance with the invention and the known device

| Characteristics of the device in accordance with the invention | Prior Art Russian Patent N2018782 | Comparison Example | Number of the device in accordance with the invention having anodes, cathodes and separators | | | | | Comparison example |
|---|---|---|---|---|---|---|---|---|
| | | 1 | 2 | 3 | 4 | 5 | 6 | 7 |
| Ratio of the maximum dimension of the elements to their thickness | 2.2 | 15 | 20 | 50 | 75 | 100 | 130 | 135 |
| Voltage, V in the case of a load of 4 Ohm | 1.2 | 0.6 | 1.2 | 1.3 | 1.2 | 1.2 | 1.3 | 1.0 |
| Time to achieve the maximum current strength, sec. | 0.6 ± 0.1 | | | | 0.20 ± 0.05 | | | |
| Operational time, sec. | 0.5 | 2 | 6 | 12 | 10 | 8 | | 0.8 |
| Functionability of the battery | not functionable | | The voltage and the current strength increase proportional to the number of cells. | | | | | |

It is not necessary to use new methods of manufacture nor to change existing installations in order to produce the anode, cathode and the separator. The components used in accordance with the invention are used to a great extent in pyrotechnics and no environmentally unfriendly products are produced during the manufacturing process.

The hitherto unknown total of characteristics of pyrotechnic generators and batteries renders possible a reliable functioning. This is as a result of the construction of the device and its electrodes, its dimension and its arrangement. Moreover, the device in accordance with the invention ensures a guarantee of 5–10 year at a storage and application temperature of ±50° C.

We claim:

1. Pyrotechnic electric generator comprises an anode and a cathode separated therefrom by means of a separator, wherein the anode comprises a pyrotechnic charge comprising an excess of fuel and the cathode comprises a pyrotechnic charge comprising an excess of oxidation agent, characterized in that the anode, cathode and separator contain asbestos as the binding agent and the anode, cathode and separator in each case comprise a ratio of maximum dimension to thickness of 20 to 130, wherein the fuel in the anode and in the cathode is zirconium and the separator comprises of lithium fluoride, alkaline earth fluoride or their mixture.

2. Pyrotechnic electric generator according to claim 1, characterized in that the anode contains the following components in the proportions quoted in percentage mass:

| | |
|---|---|
| Zirconium | 37–83 |
| Barium chromate or Copper oxide | 15–51 |
| Asbestos | 2–12 | that the cathode contains the following components in the proportions quoted in percentage mass:

| | |
|---|---|
| Zirconium | 3–28 |
| Copper oxide | 60–95 |
| Asbestos | 2–12 | and that the separator contains the following components in the proportions quoted in percentage mass:

| | |
|---|---|
| Asbestos | 3–20 |
| Lithium fluoride or Alkaline earth fluoride or their mixture | 80–97 |

3. Pyrotechnic generator according to claim 1, characterized in that the anode contains the following components in the proportions quoted in percentage mass:

| | |
|---|---|
| zirconium | 37–83 |
| barium chromate or copper oxide | 15–51 |
| asbestos | 2–12; | the cathode contains the following components in the proportions quoted in percentage mass:

| | |
|---|---|
| zirconium | 3–28 |
| copper oxide | 60–95 |
| asbestos | 2–12; | the separator contains the following components in the proportions quoted in percentage mass:

| | |
|---|---|
| asbestos | 3–8 |
| lithium fluoride or alkaline earth fluoride or their mixture | 32–97 |
| zirconium oxide | 0–60. |

* * * * *